US009010362B2

(12) United States Patent
Aoba et al.

(10) Patent No.: US 9,010,362 B2
(45) Date of Patent: Apr. 21, 2015

(54) PRESSURE CONTROL RESERVOIR WITH CHECK VALVE

(71) Applicants: Denso Corporation, Kariya, Aichi-pref. (JP); Advics Co., Ltd., Kariya, Aichi-pref. (JP)

(72) Inventors: Kouji Aoba, Kariya (JP); Tomoo Harada, Anjo (JP); Noriaki Asechi, Kuwana (JP); Kazuma Shigeta, Kariya (JP)

(73) Assignees: Denso Corporation, Kariya (JP); Advics Co., Ltd., Kariya (JP)

( * ) Notice: Subject to any disclaimer, the term of this patent is extended or adjusted under 35 U.S.C. 154(b) by 0 days.

(21) Appl. No.: 14/079,006

(22) Filed: Nov. 13, 2013

(65) Prior Publication Data

US 2014/0130925 A1 May 15, 2014

(30) Foreign Application Priority Data

Nov. 14, 2012 (JP) ................. 2012-250486

(51) Int. Cl.

| G05D 16/10 | (2006.01) |
|---|---|
| B60T 7/04 | (2006.01) |
| B60T 8/48 | (2006.01) |
| B60T 13/14 | (2006.01) |
| B60T 13/68 | (2006.01) |

(Continued)

(52) U.S. Cl.
CPC .............. *B60T 7/042* (2013.01); *G05D 16/103* (2013.01); *B60T 8/368* (2013.01); *B60T 8/4872* (2013.01); *B60T 13/147* (2013.01); *B60T 13/686* (2013.01); *B60T 17/06* (2013.01)

(58) Field of Classification Search
CPC ....... B60T 7/042; B60T 17/06; B60T 13/147; B60T 13/686; B60T 8/368; B60T 8/4872; G05D 16/103
USPC ............ 303/115.1, 115.4, 119.2; 251/315.01, 251/315.02, 315.03, 315.04, 315.05, 251/315.06, 315.07; 137/505.26, 505.27, 137/505.29, 505.38, 505.39, 505.41, 137/505.42, 505.44, 505.45
See application file for complete search history.

(56) References Cited

U.S. PATENT DOCUMENTS

| 2,343,146 | A | * | 2/1944 | Jenkins | .................... | 137/316 |
| 2,447,067 | A | * | 8/1948 | Hamilton | ................. | 137/505.42 |
| 2,764,996 | A | * | 10/1956 | Brown | .............................. | 92/95 |

(Continued)

FOREIGN PATENT DOCUMENTS

| DE | 4202388 | 8/1993 |
| DE | 102008062039 | 6/2010 |

(Continued)

*Primary Examiner* — William McCalister
(74) *Attorney, Agent, or Firm* — Harness, Dickey & Pierce, PLC

(57) ABSTRACT

A pressure control reservoir includes a valve ball and a shaft which is movable to move the valve ball to open or close a fluid path leading to a fluid reservoir chamber. The shaft has a tip with a slant surface which has a peripheral edge of a polygonal shape with even numbers of vertices and is inclined to the longitudinal center line of the shaft. Such a polygonal geometry increases an entire or inclined length of the slant surface, which results in an increased range where an angle which the slant surface makes with a plane extending perpendicular to an axial direction of the tip is permitted to be increased without causing the point of contact between the valve ball and the slant surface to be shifted close to the tip of the slant surface when the tip of the shaft moves the valve ball.

3 Claims, 13 Drawing Sheets

(51) Int. Cl.
  *B60T 17/06* (2006.01)
  *B60T 8/36* (2006.01)

(56) References Cited

U.S. PATENT DOCUMENTS

| | | | | |
|---|---|---|---|---|
| 2,777,456 | A | * | 1/1957 | Ey .................................. 137/73 |
| 3,113,432 | A | * | 12/1963 | Watson ........................... 60/327 |
| 3,137,312 | A | * | 6/1964 | Vaughn ..................... 137/505.15 |
| 3,139,902 | A | * | 7/1964 | Thomas ........................ 137/557 |
| 4,089,343 | A | * | 5/1978 | Ishida ........................ 137/484.8 |
| 4,257,449 | A | * | 3/1981 | Takagi ..................... 137/505.25 |
| 4,942,899 | A | * | 7/1990 | Vork et al. ................. 137/454.5 |
| 5,113,831 | A | * | 5/1992 | Grant ............................ 123/457 |
| 6,302,498 | B1 | | 10/2001 | Ariki et al. |
| 2002/0170601 | A1 | * | 11/2002 | Smith ..................... 137/505.42 |
| 2003/0230929 | A1 | | 12/2003 | Inage et al. |
| 2003/0230930 | A1 | | 12/2003 | Inage et al. |
| 2006/0091725 | A1 | | 5/2006 | Ariki et al. |
| 2008/0136250 | A1 | | 6/2008 | Ganzel |
| 2010/0052417 | A1 | | 3/2010 | Aoba et al. |
| 2010/0244553 | A1 | | 9/2010 | Oosawa |
| 2012/0139331 | A1 | | 6/2012 | Terashima et al. |
| 2012/0139332 | A1 | | 6/2012 | Terashima et al. |
| 2012/0139333 | A1 | | 6/2012 | Terashima et al. |
| 2013/0088076 | A1 | | 4/2013 | Oosawa |

FOREIGN PATENT DOCUMENTS

| | | |
|---|---|---|
| JP | 2000-142346 | 5/2000 |
| JP | 2004-019805 | 1/2004 |
| JP | 2004-068811 | 3/2004 |
| JP | 2006-151362 | 6/2006 |
| JP | 2010-076747 | 4/2010 |
| JP | 2010-221890 | 10/2010 |
| JP | 2010-280331 | 12/2010 |
| JP | 2012-121340 | 6/2012 |
| JP | 2012-121341 | 6/2012 |
| JP | 2012-131378 | 7/2012 |
| JP | 2012-159106 | 8/2012 |

* cited by examiner

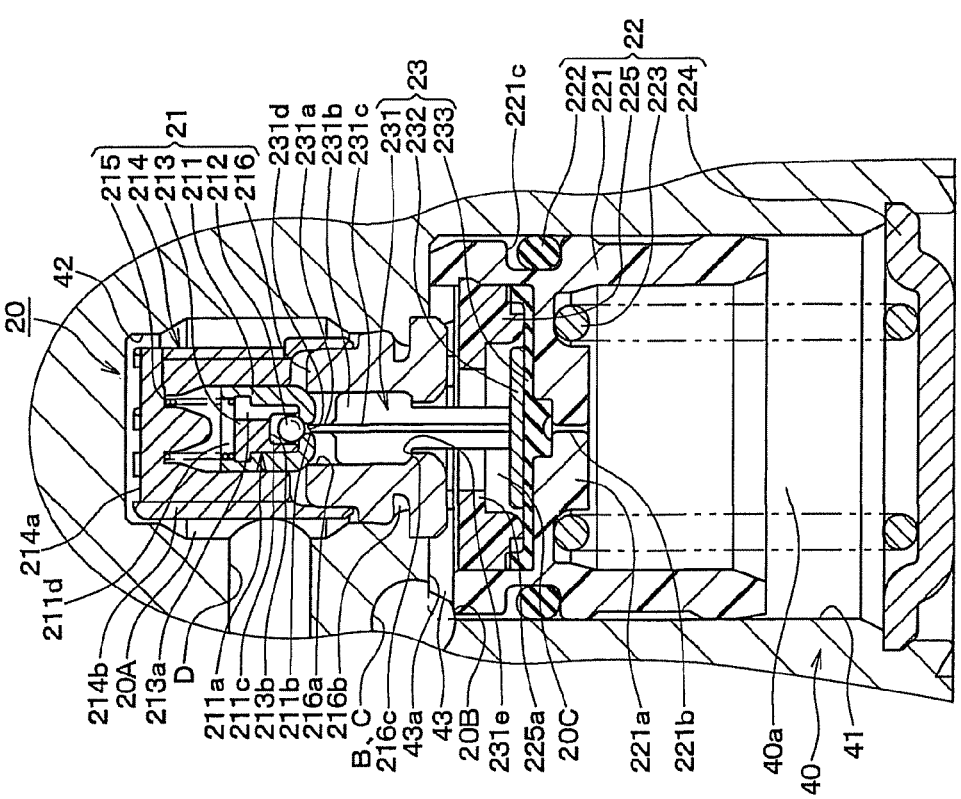
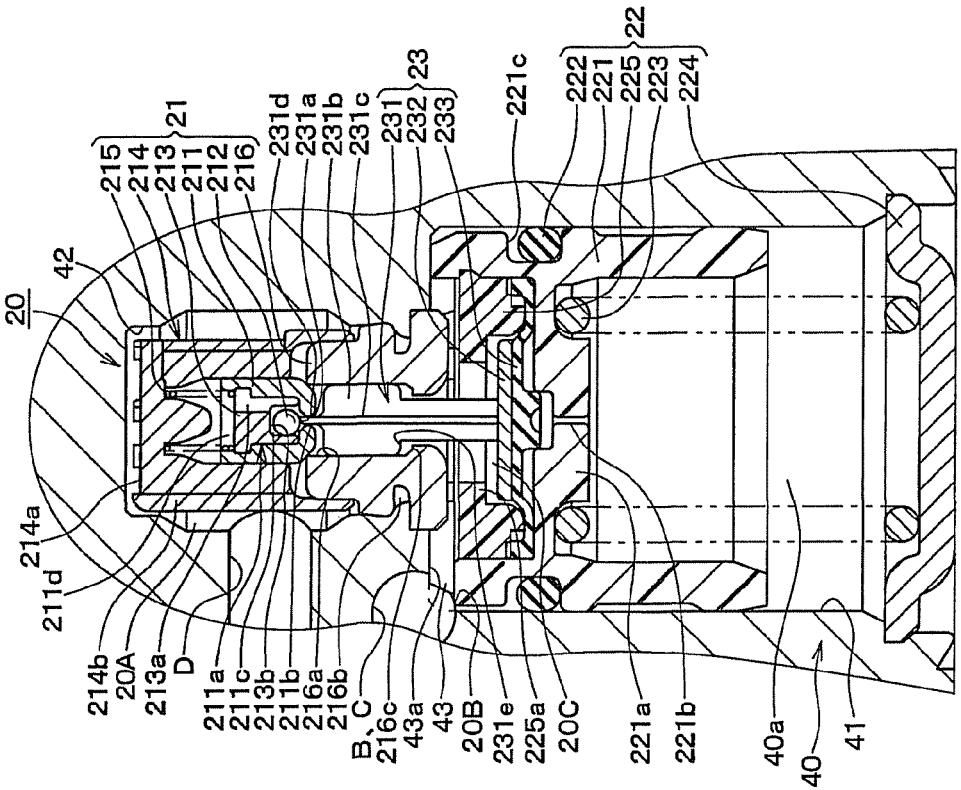

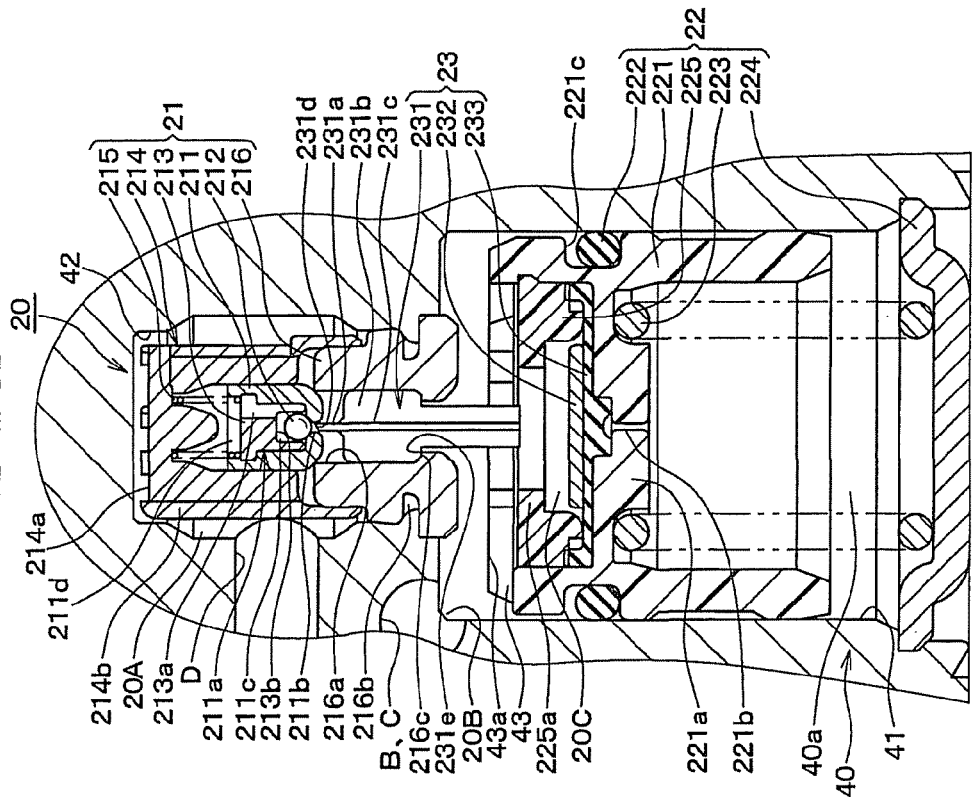
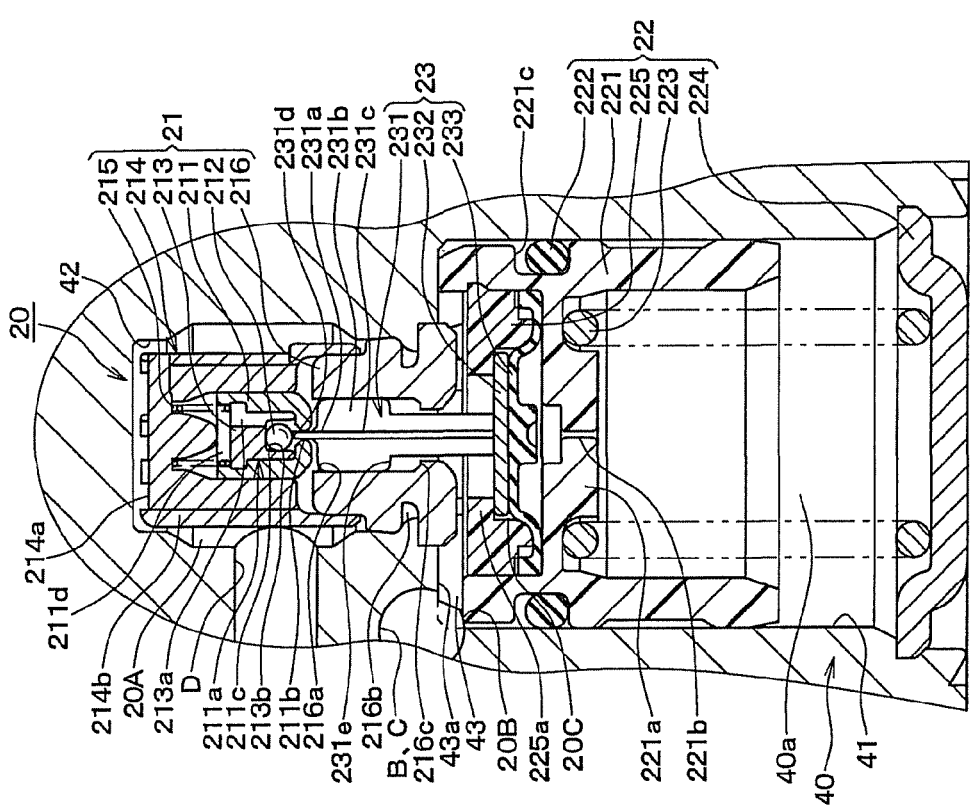

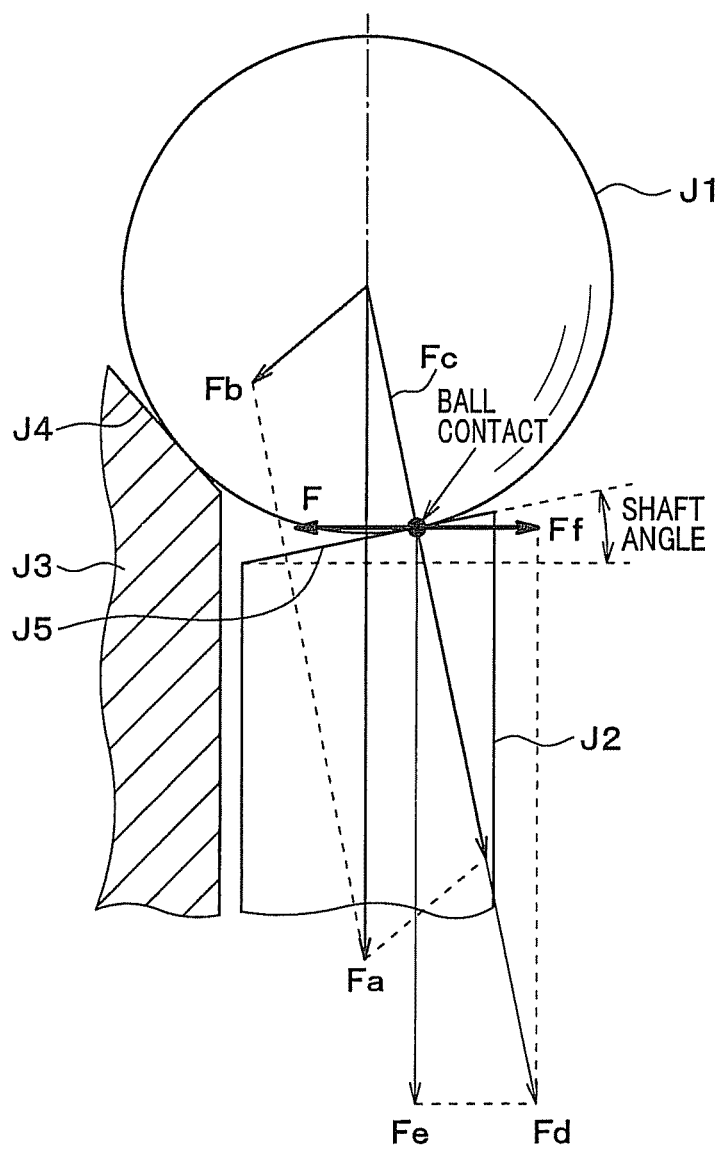

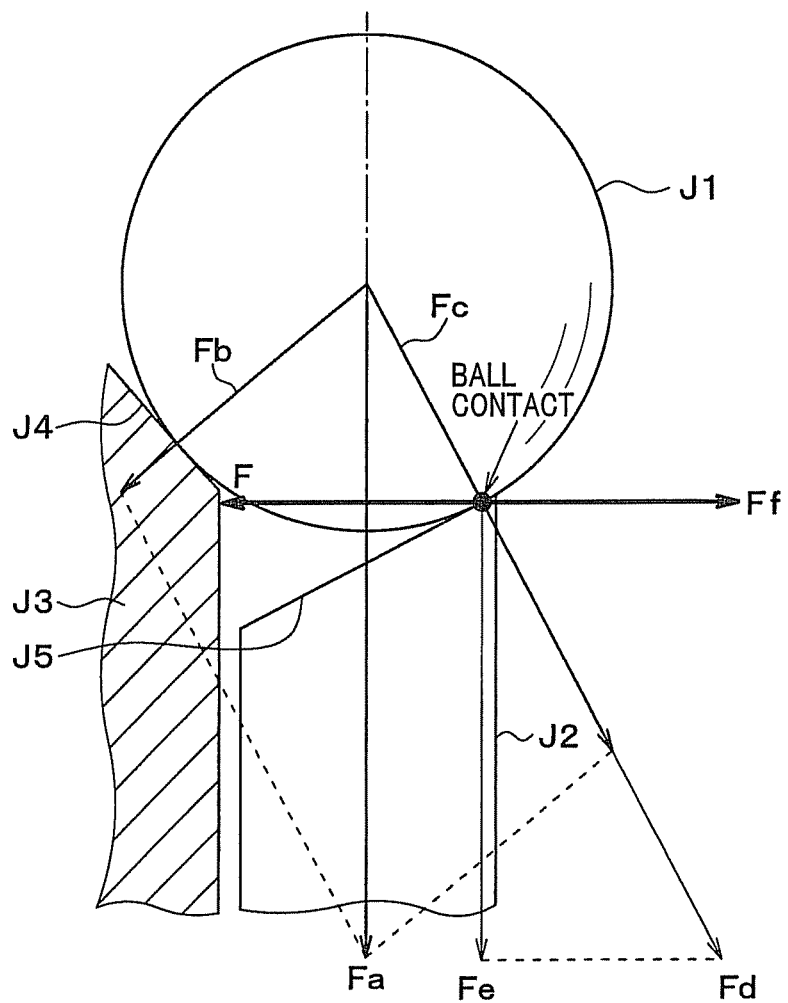

FIG.10

| SHAFT ANGLE : SMALL | SHAFT ANGLE : MEDIUM | SHAFT ANGLE : LARGE |
|---|---|---|
| LATERAL FORCE F : SMALL | LATERAL FORCE F : MEDIUM | LATERAL FORCE F : MEDIUM |
| BALL CONTACT : LOWER PART OF SLANT SURFACE | BALL CONTACT : UPPER PART OF SLANT SURFACE | BALL CONTACT : TIP OF SHAFT |

US 9,010,362 B2

PRESSURE CONTROL RESERVOIR WITH CHECK VALVE

CROSS-REFERENCE TO RELATED DOCUMENT

The present application claims the benefit of priority of Japanese Patent Application No. 2012-250486 filed on Nov. 14, 2012, the disclosure of which is incorporated herein by reference.

BACKGROUND OF THE INVENTION

1. Technical Field of the Invention

This disclosure relates generally to a structure of a pressure control reservoir with a valve which is moved by a shaft to open or close a hydraulic path leading to a reservoir chamber, and more particularly to such a pressure control reservoir through which, for example, a brake fluid in a wheel cylinder (W/C) flows in a brake fluid pressure control mode in an antilock brake system (ABS).

2. Background Art

Japanese Patent First Publication No. 2010-76747 teaches a pressure control reservoir (also called a switch reservoir) which is mounted in a brake system for automotive vehicles which is operable in an ABS (Antilock Brake System) control mode. The pressure control reservoir is equipped with a valve and a valve seat. The valve has a small-diameter fluid path, a seat surface formed around the small-diameter fluid path, and a ball resting on the seat surface. The valve seat has a shaft inserted into the small-diameter fluid path of the valve. The shaft is movable to lift the ball away from the seat valve selectively to open the small-diameter fluid path.

Specifically, the pressure control reservoir also includes a reservoir piston which define a reservoir chamber. The locational relation between the ball and the seat surface is controlled by movement of the reservoir piston and the shaft which is established by an operating condition of a pump leading to the reservoir chamber and the pressure in a hydraulic path extending upstream of the valve (i.e., the pressure in a master cylinder M/C). When a pressure control mode is entered, the valve is moved away from the seat surface to open the small-diameter fluid path or rests on the seat surface to close the small-diameter fluid path, thereby regulating the size or volume of a gap between the ball and the seat surface to control the flow rate of the brake fluid to be sucked into the pump through the small-diameter fluid path.

More specifically, in the pressure control mode, the ball is pushed or lifted up by the top of the shaft to create a given gap between the ball and the seat surface and then retained as it is. The ball is, however, oscillated by the flux of the brake fluid. In order to alleviate such a problem, the pressure control reservoir, as taught in the above publication, is designed to have a tapered surface formed on the top of the shaft. The tapered surface slants diagonally to the length of the shaft. The tapered surface faces the ball in contact therewith and works to lift the ball away from the seat surface in a diagonal direction to create the gap between the ball and the seat surface. The ball is retained on the tapered surface to be stable, thereby suppressing the oscillation of the ball.

The ball of the above pressure control reservoir is, as described above, pressed diagonally by the tapered surface, so that a lateral force is exerted on the ball in a direction traversing the length of the shaft. The greater the angle which the tapered surface makes with a plane extending perpendicular to the length of the shaft, the greater the lateral force. Such an angle will also be referred to as a shaft angle below. The size of the valve in which the small-diameter fluid path is formed usually depends upon the size of the pressure control reservoir. Additionally, the dimensions of the small-diameter fluid path and the shaft depend upon the flow rate of brake fluid required to open the valve or in the pressure control mode. There is, therefore, a limit to increase the shaft angle, which will be described below in detail with reference to FIGS. 9(a) to 9(c) and FIG. 10.

The lateral force F, as indicated by a thick line arrow, increases with a change in the shaft angle. Specifically, if the pressure of brake fluid which presses the ball J1 in a direction in which the shaft J2 moves is defined as force Fa, this will be divided into two components: one Fb oriented to the seat surface J4 of the valve J3, and the second Fc oriented to the tapered surface J5 of the valve J3. The component Fc facing the tapered surface J5 will be force Fd acting on the tapered surface J5. The force Fd is distributed into force Fe oriented in an axial direction (i.e., a longitudinal direction) of the shaft J2 and force Ff which is directed perpendicular to the axial direction of the shaft J2 and passes through the longitudinal center line of the shaft J2 and a point of contact between the ball J1 and the tapered surface J5. The force Ff is equal to the lateral force F. An increase in the shaft angle will result in an increase in the force Ff that is one of the components of the force Fd exerted on the tapered surface J5, so that the lateral force F will increase.

However, the increase in the shaft angle will, as can be seen in FIGS. 9(a) to 9(c), cause the point of contact between the ball J1 and the tapered surface J5 to be shifted toward the tip of the tapered surface J5. When the point of contact between the ball J1 and the tapered surface J5 is on the tip of the tapered surface J5, it will be impossible to create the lateral force F acting on the ball J1. It means that there is a limit to increase the shaft angle. Specifically, the increase in the shaft angle, as can be seen from the table of FIG. 10, will result in an increase in the lateral force F, but however, it will cause the point of contact between the ball J1 and the tapered surface J5 to be shifted to the tip of the tapered surface J5, which limits the shaft angle.

SUMMARY OF THE INVENTION

It is therefore an object of this disclosure to provide an improved structure of a pressure control reservoir which permits the shaft angle to be increased without sacrificing the contact between the ball and the tapered surface of the shaft.

According to one aspect of the invention, there is provided a pressure control reservoir for use in a vehicle, such as an automotive vehicle, equipped a brake system. The pressure control reservoir comprises: (a) a housing; (b) a reservoir chamber which is formed in the housing; (c) a fluid flow path which is formed inside the housing and through which fluid flows, the fluid flow path leading to the reservoir chamber; (d) a valve body which has formed therein a fluid path which serves as a portion of the fluid flow path, the valve body also having a seat surface around the fluid path; (e) a valve ball which works to selectively open and close the fluid path formed in the valve body; (f) a shaft which is movable to make the valve ball rest on or leave the seat surface of the valve body to close or open the fluid path, thereby developing a flow rate of the fluid flowing into the reservoir chamber as a function of a size of a gap, as created between the valve ball and the seat surface; and (g) a piston which defines the reservoir chamber within the housing and works to move the shaft.

The shaft has a tip which is polygonal in cross section extending perpendicular to a longitudinal center line of the shaft. The tip has formed on an end thereof a slant surface which faces the valve ball and works to make a physical contact with the valve ball to make the valve ball rest on or leave the seat surface of the valve body.

The slant surface is inclined at a given angle to a direction perpendicular to the longitudinal center line of the shaft. Specifically, the slant surface has a peripheral edge of a polygonal shape with even numbers of vertices and is geometrically formed so that a diagonal line that is one of diagonals of a polygon, as defined the peripheral edge, which traverses the longitudinal center line of the shaft is inclined at the given angle to the direction perpendicular to the longitudinal center line of the shaft, and one of two opposing corners of the polygon lying on the diagonal line is located farthest from the piston, while the other corner is located closest to the piston.

The polygonal geometry of the slant surface increases an entire or inclined length thereof, thus resulting in a widened range where a shaft angle that is an angle which the slant surface makes with a plane extending perpendicular to an axial direction of the tip is permitted to be increased without causing the point of contact between the valve ball and the slant surface to be shifted close to the tip of the slant surface when the tip of the shaft moves the valve ball.

In the preferred mode of the embodiment, the tip of the shaft may be of a quadrangular prism shape.

The shaft may be made of an assembly of two press-formed plates. One of the press-formed plates is so shaped as to have a tip whose thickness is identical with a thickness of the one of the press-formed plates and which forms the tip of the shaft.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings:

FIG. 6(a) is a longitudinal sectional view which illustrates the pressure control reservoir of FIG. 1 when a brake system is placed in a normal braking mode;

FIG. 6(b) is a longitudinal sectional view which illustrates the pressure control reservoir of FIG. 1 when a brake system is placed in a pressure regulating mode;

FIG. 6(c) is a longitudinal sectional view which illustrates the pressure control reservoir of FIG. 1 when a brake system is placed in a self-priming mode;

FIG. 6(d) is a longitudinal sectional view which illustrates the pressure control reservoir of FIG. 1 when a brake system is placed in an antilock braking mode;

FIG. 9(a) is an explanatory sectional view which illustrates a relation among a shaft angle, a lateral force, and a point of contact between a valve ball and a tapered surface of a shaft;

FIG. 9(c) is an explanatory sectional view which illustrates a relation among a shaft angle, a lateral force, and a point of contact between a valve ball and a tapered surface of a shaft; and FIG. 10 is a view which shows a table listing relations between a shaft angle and a point of contact between a valve ball and a tapered surface of a shaft.

DESCRIPTION OF THE PREFERRED EMBODIMENTS

Figure 1:
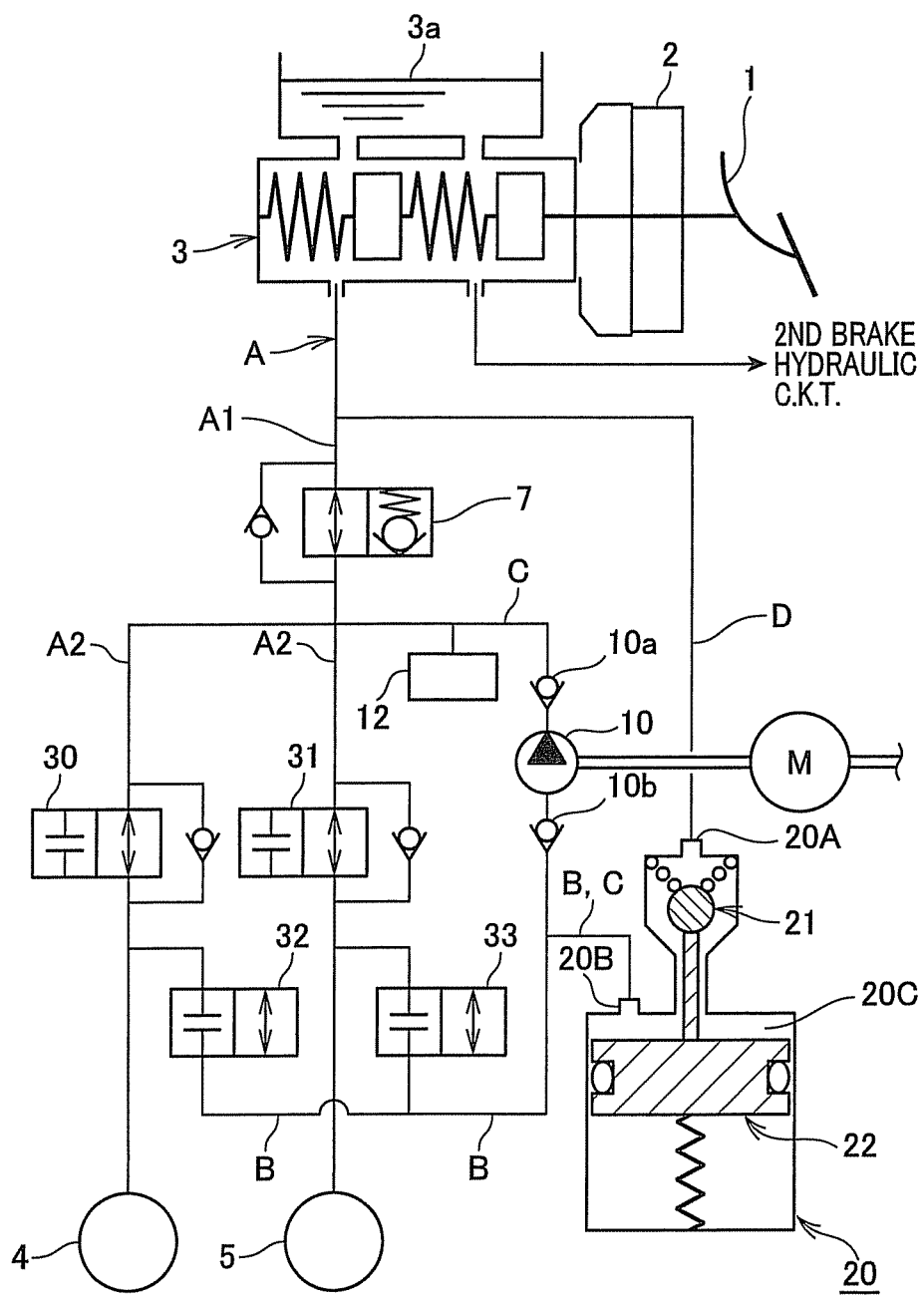
FIG. 1 is a circuit diagram which illustrates a brake system equipped with a pressure control reservoir according to the first embodiment of the invention.

Referring to the drawings, wherein like reference numbers refer to like parts in several views, particularly to FIG. 1, there is shown a brake system equipped with a pressure control reservoir 20 according to the first embodiment of the invention. The brake system, as referred to herein, is used with an automotive vehicle equipped with a so-called diagonal split system which includes two brake hydraulic circuits one of which controls the right front and the left rear wheel and the other of which controls the left front and the right rear wheel, but may be used with a front/rear split system.

The brake system includes a brake pedal 1 (i.e., a brake actuating member) to be depressed by a vehicle occupant or driver for applying the brakes to the vehicle. The brake pedal 1 is connected to a brake booster (also called a vacuum servo or servo unit) 2 which works to boost the pressure applied to a brake pedal 1.

The brake booster 2 is equipped with a pushrod which transmits the pressure, as enhanced by the brake booster 2, to a master cylinder (M/C) 3. The pushrod serves to push pistons installed in the master cylinder 3 to create a hydraulic pressure (which will also be referred to as a master cylinder pressure below). The master cylinder 3 is also connected to a master reservoir 3a. The mater reservoir 3a supplies the brake fluid to the master cylinder 3 or stores an excess of the brake fluid in the master cylinder 3.

The master cylinder pressure is transmitted through an ABS (Antilock Brake System) actuator to wheel cylinders 4 and 5. For the brevity of illustration, FIG. 1 shows only one of two brake hydraulic circuits of the diagonal split system which leads to the right front wheel cylinder 4 and the left rear wheel cylinder 5, but however, the brake system of this embodiment is, as described above, also equipped with the second brake hydraulic circuit which leads to left front and right rear wheel cylinders. The second brake hydraulic circuit is identical in structure and operation with the first brake hydraulic circuit, as illustrated in FIG. 1, and explanation thereof in detail will be omitted here.

The brake system also includes a main hydraulic line A coupled to the master cylinder 3. The main hydraulic line A has disposed therein a differential pressure control valve 7 from which two branch lines: a branch line A1 and a branch line A2 extend. Specifically, the main hydraulic line A is made up of three sections: a hydraulic line A1 and two hydraulic branch lines A2. The hydraulic line A1 extends between the differential pressure control valve 7 and the master cylinder 3 and transmits the master cylinder pressure therebetween. One of the branch lines A2 (which will also be referred to as a first branch line below) extends between the differential pressure control valve 7 and the wheel cylinder 4 and transmits the master cylinder pressure therebetween. The other branch line A2 (which will also be referred to as a second branch line below) extends between the differential pressure control valve 7 and the wheel cylinder 5 and transmits the master cylinder pressure therebetween.

The differential pressure control valve 7 is operable in either of two modes: an open mode and a pressure-difference mode. Usually, the differential pressure control valve 7 is in the open mode. In the pressure difference mode, the differential pressure control valve 7 works to keep the pressure in the wheel cylinders 4 and 5 higher than that in the master cylinder 3 by a given level.

The first branch line A2 has installed therein a pressure-increasing valve 30 which controls the increasing of pressure of the brake fluid to be delivered to the wheel cylinder 4. Similarly, the second branch line A3 has installed therein a pressure-increasing valve 31 which controls the increasing of pressure of the brake fluid to be delivered to the wheel cylinder 5.

Each of the pressure-increasing valves 30 and 31 is implemented by a two-position valve which is opened or closed by an electronic control unit (ECU) 100 in a brake fluid pressure control mode. When opened, the pressure-increasing valves 30 and 31 deliver the master cylinder pressure or a hydraulic brake pressure, as produced by a pump 10 which will be described later in detail, to the wheel cylinders 4 and 5, respectively. Each of the pressure-increasing valves 30 and 31 is normally kept open when the brake system is not in the brake fluid pressure control mode (e.g., an antilock braking mode). Such a mode will also be referred to as a normal braking mode below.

The brake system also includes hydraulic lines B leading to the branch lines A2 between the pressure-increasing valve 30 and the wheel cylinder 4 and between the pressure-increasing valve 31 and the wheel cylinder 5, respectively. The hydraulic lines B also connect with a reservoir port 20B of the pressure control reservoir 20. The brake fluid in each of the wheel cylinders 4 and 5 is delivered to the pressure control reservoir 20 through the hydraulic lines B for controlling the skidding of the wheels of the vehicle, that is, prevent the wheel lock. The structure of the pressure control reservoir 20 will be described later in detail.

The hydraulic lines B have installed therein pressure-reducing valves 32 and 33, respectively, which are opened or closed by the ECU 100. Each of the pressure-reducing valves 32 and 33 is normally kept closed when the brake system is in the normal braking mode. When it is required to drain the brake fluid from the wheel cylinders 4 and 5 to the pressure control reservoir 20, the pressure-reducing valves 32 and 33 are opened by the ECU 100, respectively.

The brake system also includes hydraulic lines C and D. The hydraulic line C connects at an end thereof to a joint between the differential pressure control valve 7 and each of the hydraulic lines A2 and also at the other end to the reservoir port 20B of the pressure control reservoir 20. The reservoir port 20B is connected hydraulically to the inlet of the pump 10 through a portion of the hydraulic lines B and C. The brake fluid, as drained to the pressure control reservoir 20 in the antilock braking mode, is returned by the operation of the pump 10 back to the hydraulic line A through the above described portion of the hydraulic lines B and C to elevate the pressure in the wheel cylinders 4 and 5. The hydraulic line C has the pump 10, check valves 10a and 10b, and an accumulator 12 installed therein. The accumulator 12 is disposed downstream of the pump 10 and works to absorb pulsation of the brake fluid discharged by the pump 10. The hydraulic line D connects between a reservoir port 20A and the master cylinder 3. The pump 10 sucks the brake fluid from the hydraulic line A1 through the hydraulic line D and the pressure control reservoir 20 and discharges it to the hydraulic lines A2 through a portion of the hydraulic line B and the hydraulic line C, thereby increasing the pressure in the wheel cylinders 4 and 5.

The structure of the pressure control reservoir 20 will be described below with reference to FIGS. 2 and 3.

The pressure control reservoir 20 is used both in the antilock braking mode and in a flow rate control mode in which a flow rate of the brake fluid sucked from the master cylinder 3 to the pump 10 is so regulated as to elevate the pressure in the wheel cylinders 4 and 5 to a level higher than the master cylinder pressure. Such flow rate regulation is achieved by balancing between the master cylinder pressure and the pressure in a reservoir chamber 20C of the pressure control reservoir 20 and will be referred to a pressure regulating mode below.

The pressure control reservoir 20 is mounted in a housing 40 that serves as a shell of an ABS actuator. The housing 40 has a chamber 41 formed therein. The chamber 41 has an inner wall which defines reservoir ports 20A and 20B and a reservoir chamber 20C. The chamber 41 (i.e., the housing 40) has an inner shoulder 43a to define a first chamber 42 (which will also be referred to as a small-diameter chamber) and a second chamber 43 (which will also be referred to as a large-diameter chamber) which continues from and communicates with the first chamber 42. Specifically, the first chamber 42 extends from an upper wall (i.e., the inner shoulder 43a) of the second chamber 43, in other words, is located more upstream of a flow of the brake fluid from the reservoir port 20A to the reservoir port 20B than the second chamber 43 is. The first chamber 42 is greater in depth, but smaller in diameter than the second chamber 43. The first chamber 42 has a longitudinal center line extending parallel to that of the second chamber 43. In the example of FIG. 2, the longitudinal center line of the first chamber 42 is aligned with that of the second chamber 43. The first chamber 42 forms the reservoir port 20A. Similarly, the second chamber 43 forms the reservoir port 20B. The inner surface of the second chamber 43 and other parts define the reservoir chamber 20C.

The reservoir port 20A leads to the master cylinder 3, so that the brake fluid flows into the reservoir port 20A from a hydraulic line D (i.e., an inlet pipe or line) in which the pressure is identical with the master cylinder pressure. The reservoir port 20B communicates the reservoir chamber 20C with the hydraulic lines B and C (i.e., outlet pipes or line). The reservoir chamber 20C is defined by the inner wall of the second chamber 43 and a piston body 221, as will be described later in detail, and works to store the brake fluid, as inputted from the reservoir port 20A or 20B, and discharge it from the reservoir port 20B. The hydraulic lines B, C, and D have portions which serve as a fluid flow path which extends through the reservoir chamber 20C within the pressure control reservoir 20 (i.e., the housing 40) and is opened or closed by a valve assembly 21, as described below.

The first chamber 42 has disposed therein the valve assembly 21 which works as a check valve and is made up of a valve body 211, a valve ball 212, a pin 213, a filter unit 214, a spring 215, and a valve seat 216.

The valve body 211 is made of an iron-based metal and functions as a valve member along with the valve ball 212 and the pin 213 to selectively open or close a large-diameter fluid path 216a formed in the valve asset 216. The valve body 211 also has a brake fluid flow path which is smaller in diameter than the large-diameter fluid path 216a of the valve seat 216 and established when the large-diameter fluid path 216a is closed. Specifically, the valve body 211 is of a hollow cylindrical shape and has formed therein a cavity 211a which extends in alignment with the longitudinal center line thereof and serves as the brake fluid flow path.

The cavity 211a is shaped to have inner shoulders and has the brake fluid flow path decreasing gradually or stepwise in size thereof toward the valve seat 216. Specifically, the cavity 211a includes a small-diameter fluid path 211b, a first chamber 211c, and a second chamber 211d. The small-diameter fluid path 211b is located closer to the valve seat 216 than the first and second chambers 211c and 211d are and smaller in diameter (i.e., a path area) than the large-diameter fluid path 216a. The small-diameter fluid path 211b leads to the hydraulic lines B and C through the large-diameter fluid path 216a and the reservoir chamber 20C. In other words, the small-diameter fluid path 211b serves as a portion of the fluid flow path, as described above, extending between the reservoir ports 20A and 20B through the reservoir chamber 20C. The first chamber 211c is greater in diameter than the small-diameter fluid path 211b and located farther away from the valve seat 216 than the small-diameter fluid path 211b is. The valve ball 212 is disposed inside the small-diameter fluid path 211b. The second chamber 211d is greater in diameter than the first chamber 211c and has the pin 213 disposed therein. One of the inner shoulders of the cavity 211a which is a boundary between the small-diameter fluid path 211b and the first chamber 211c has a chamfered or tapered seat surface formed around an opening of the small-diameter fluid path 211b The valve ball 212 rests on the seat surface to block the fluid communication between the small-diameter fluid path 211b and the first chamber 211c.

The valve ball 212 is made of an iron-based metal and shaped to be smaller in diameter than the first chamber 211c and greater in diameter than the small-diameter fluid path 211b. The valve ball 212 selectively rests on the seat surface of the valve body 211 to close the small-diameter fluid path 211b.

The pin 213 is made of an iron-based metal and serves as a support to retain the valve ball 212 within the valve body 211. In the normal braking mode, the valve ball 212 is placed to close the small-diameter fluid path 211b.

The pin 213 is press-fit in the cavity 211a of the valve body 211, so that it is movable together with the valve body 211. The pin 213 has a head placed in contact abutment with the inner shoulder (i.e., the inner end wall) of the valve body 211, so that it is fixed in place within the cavity 211a. The pin 213 is of a cylindrical shape and has a flange 213f formed on an end thereof. The pin 213 has at least one connecting path 213a which extends in an axial direction thereof. The connecting path 213a works as a flow path through which the brake fluid flows.

The pin 231 also has a chamber 213b formed in a head (i.e., a lower end, as viewed in FIG. 2) thereof. The valve ball 212 is disposed within the chamber 213b. The chamber 213b is shaped to have a depth which is great enough to create a gap between the valve ball 212 and the bottom wall (i.e., an upper wall, as viewed in FIG. 2) of the chamber 213b when the valve ball 212 rests on the seat surface of the valve body 211. The depth of the chamber 231b is also so selected that the amount of lift of the valve ball 212 when pushed by a shaft 231, as will be described later in detail, away from the seat surface is smaller than an interval (i.e., the shortest distance) between a cross-shaped fin 231c of the shaft 231 and the valve body 211.

In the normal braking mode, the valve ball 212 rests on the seat surface of the valve body 211 to close the small-diameter fluid path 211b (i.e., the brake fluid flow path). When a piston 22, as will be described later in detail, is moved to decrease the volume of the reservoir chamber 20C, the valve ball 212 is pushed by the shaft 231 away from the seat surface. The amount of lift of the valve ball 212 when pushed by the shaft 231 is, as described above, smaller than the interval between the cross-shaped fin 231c of the shaft 231 and the valve body 211, thus causing the valve ball 212 to make physical contact with the bottom of the chamber 213b without contact between the cross-shaped fin 231c and the valve body 211. The pin 213 is, therefore, moved upward, as viewed in FIG. 2, by force exerted by the shaft 231 on the valve ball 212 against the pressure, as produced by the spring 215, thereby moving the valve 211 to open the large-diameter fluid path 216a.

The filter unit 214 is made of metal or resin material and includes a circular bottom plate 214a and six poles 214b which stands on the bottom plate 214a at regular intervals away from each other. The filter unit 214 also has a hollow cylindrical mesh which covers around the poles 214b, like a cup-shape along with the bottom plate 214a.

The spring 215 is disposed between the pin 213 and the filter unit 214 and elastically urges the assembly of the pin 213 and the valve body 211 toward the valve seat 216.

The valve seat 216 is of a hollow cylindrical shape and made of an iron-based metal. The valve seat 216 has formed therein the large-diameter fluid path 216a which serves as an inlet path through which the brake fluid flows into the reservoir chamber 20C. The shaft 213 is partially inserted into the large-diameter fluid path 216a. The shaft 213 is retained by the inner wall of the valve seat 216 to be reciprocable in an axial direction thereof.

Figure 2:
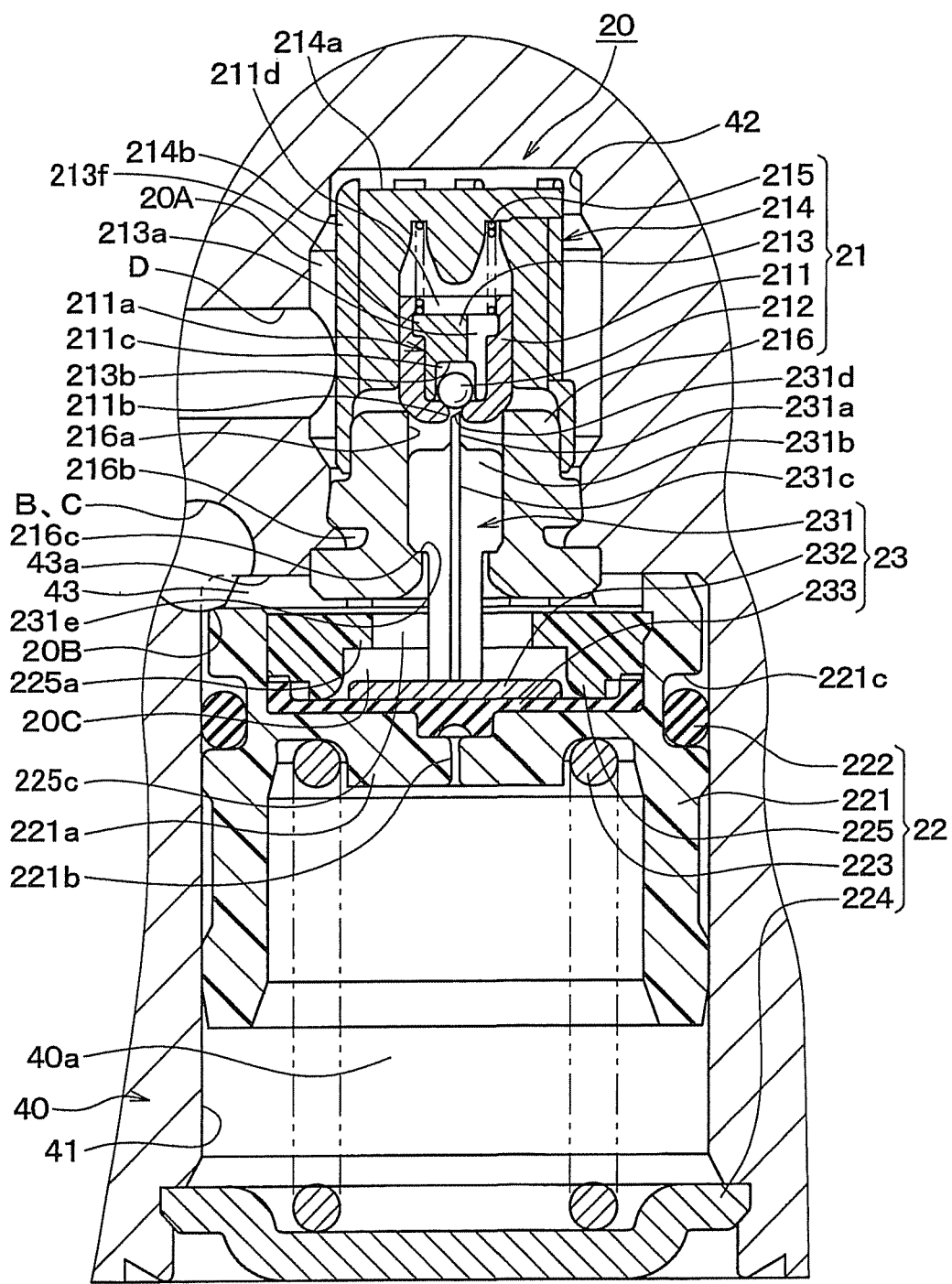
FIG. 2 is a longitudinal sectional view which illustrates the pressure control reservoir of FIG. 1.

The valve seat 216 is so shaped as to have an upper end, as viewed in FIG. 2, whose outer diameter is equal to or slightly greater than an inner diameter of a lower opening of the filter unit 214. The valve body 211, the valve ball 212, the pin 213, and the spring 215 are disposed inside the filter unit 214, after which the valve seat 216 is press-fit in the opening of the filter unit 214, thereby making an assembly of the valve body 211, the valve ball 212, the pin 213, the spring 215, and the filter unit 214 in the form of a unit working as the check valve 21. The valve seat 216 has outer shoulders or flanges formed on an outer periphery thereof and is greatest in outer diameter at a portion (i.e., a head) located farthest away from the filter unit 214. The greatest outer diameter is greater than an inner diameter of an inlet of the first chamber 42. The installation of the check valve 21 in the housing 40 is achieved by inserting or pressing the valve seat 216 along with the filter unit 214 into the first chamber 42 and crimping a portion of the housing 40 with the greatest diameter portion of the valve seat 216.

The valve seat 216 has an annular groove 216b extending in an entire circumference thereof. The housing 40 partially enters the annular groove 216b, thereby securing the check valve 21 firmly within the housing 40.

Within the second chamber 43, the piston 22 and a valve open/close mechanism 23 are disposed.

The piston 22 is made up of a piston body 221, an O-ring 222, a spring 223, a cover 224 and a stopper 225.

The piston body 221 is made from resin and movable in sliding contact with the inner wall of the second chamber 43 in a vertical direction, as viewed in FIG. 2. The piston body 221 has the valve open/close mechanism 23 disposed in a central area thereof. Specifically, the piston body 221 is of a hollow cylindrical shape with a partition wall 221a. The partition wall 221a defines a storage chamber in the piston body 221 within which the valve open/close mechanism 23 is mounted. The partition wall 221a has from in the center thereof a connecting hole 221b through which the pressure (i.e., atmospheric pressure) in a back chamber 40a is transmitted into the valve open/close mechanism 23.

The O-ring 222 is fit in an annular groove 221c formed in the outer periphery of the piston body 221.

The spring 223 is disposed between the piston body 221 and the cover 224 in contact with the partition wall 221a of the piston body 221 to urge the piston body 221 toward the check valve 21, in other words, in a direction in which the volume of the reservoir chamber 20C decreases.

The cover 224 bears the pressure, as produced by the spring 223. The cover 224 is joined to the housing 40. Specifically, the housing 40 has an annular edge which defines an open end of the chamber 41. The annular edge is crimped to hold a flange of the cover 224 to secure the cover 224 to the housing 40 tightly. The cover 224 has formed therein an air inlet (not shown) through which the atmospheric air is introduced into the back chamber 40a defined between the piston body 221 and the cover 224.

The stopper 225 is made from resin or iron-based material in the form of a ring. The piston body 221 serves as a support to retain the stopper 225 therein. The stopper 225 functions as a retainer to press a circumferential edge of a diaphragm 233 against the piston body 221 (i.e., the partition wall 221a) and also works to limit an upward movement of a plate 232, as described later in detail. The stopper 225 is fit in an inner wall of an upper open end of the piston body 221 which faces the check valve 21. The installation of the diaphragm 233, the plate 232, and the stopper 225 in the piston body 221 is achieved by putting the diaphragm 233 and the plate 232 in the piston body 221 and press-fitting the stopper 225 into the upper open end of the piston body 221 in a snap-fit manner. The stopper 225 is equipped with an internal rim or flange 225a protruding from an upper edge thereof inwardly to define a center hole 225c. The center hole 225c is so shaped as to have a diameter smaller than the outer diameter of the plate 232, so that the flange 225a works as a stopper to stop the movement of the plate 232.

The valve open/close mechanism 23 is equipped with the shaft 231, the plate 232, and the diaphragm 233.

The shaft 231 is disposed inside the large-diameter fluid path 216a of the valve seat 216. The shaft 213 has a square prismatic protrusion or tip 231a extending along the longitudinal center line thereof. The tip 213a is, as can be seen from FIG. 2, insertable into the small-diameter fluid path 211b of the valve body 211. The shaft 213 is slidable within the large-diameter fluid path 216a to have the tip 213a enter or leave the small-diameter fluid path 211b, so that the tip 213a moves close to or away from the valve ball 212.

Figure 3A:
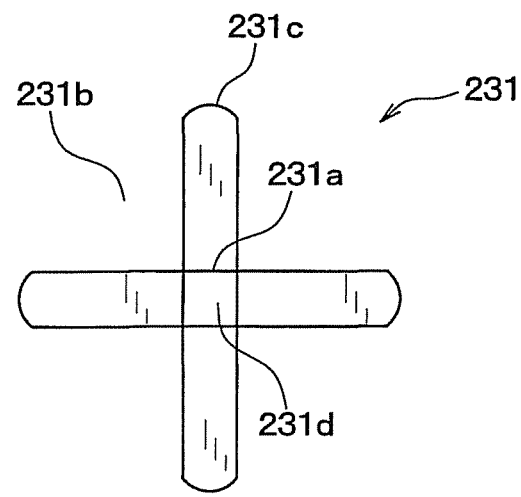
FIG. 3(a) is a top view which illustrates a shaft installed in the pressure control reservoir of FIG. 1.
Figure 3B:
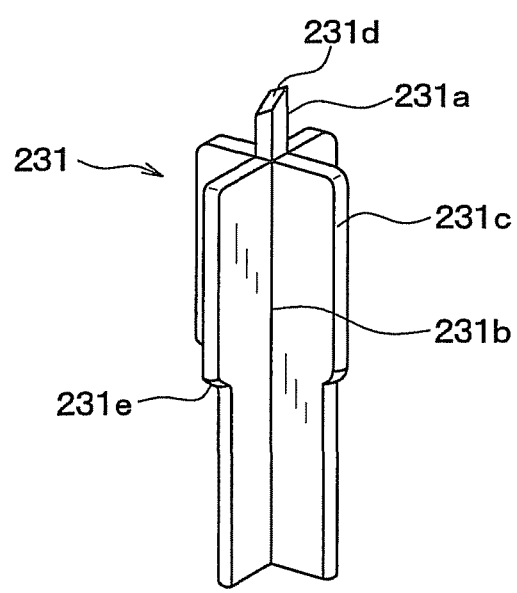
FIG. 3(b) is a perspective view which shows the shaft of FIG. 3(a)

The shaft 213, as clearly illustrated in FIGS. 3(a) and 3(b), has the cross-shaped fin 213b to define four channels 231b. The fin 213b may be formed to have another shape to make a plurality of channels 231b other than four. The channels 231b extend substantially parallel to the axial direction of the shaft 231 and arranged at a regular interval away from each other around the axis of the shaft 213. Each of the channels 231b forms a fluid path through which the brake fluid is permitted to flow.

The tip 231a extends from the top of the cross-shaped fin 231c and is square in cross section perpendicular to the length (i.e., the center axis of the shaft 231) thereof, thereby widening an area of a gap between itself and an inner wall of the small-diameter fluid path 211b (i.e., a cross sectional area of a flow path through which the brake fluid passes). The square prismatic shape of the tip 231a also results in an increase in second moment of area thereof, which leads to an increase in mechanical strength thereof.

The tip 231a has a slant surface 231d inclined at a given angle other than 90° to the axial direction (i.e., the length) of the tip 231a (i.e., the shaft 231) or to a direction perpendicular to the longitudinal center line of the tip 231a (i.e., the shaft 231). The pressure control reservoir 20 is so shaped as to have a combination of the direction of inclination of the slant surface 231d which ensures a desired physical contact of the slant surface 231d with the valve ball 212 and provides an increased value of the shaft angle, as described in the introductory part of this application.

The slant surface 231d works to direct the valve ball 212 diagonally when the tip 231a lifts the valve ball 212 away from the seat surface of the valve body 211. This produces the lateral force F acting on the valve ball 212, so that the valve ball 212 is retained between the seat surface of the valve body 211 the slant surface 231d or the inner wall of the pin 213, thereby ensuring the stability in location of the valve ball 212 to avoid a mechanical oscillation of the valve ball 212 arising from the flow of the brake, fluid. The retaining of the valve ball 212 between the seat surface of the valve body 211 the slant surface 231d or the inner wall of the pin 213 also keeps the gap between the valve ball 212 and the seat surface, that is, an open area of the small-diameter fluid path 211b constant. Such an open area may be regulated by changing dimensions or sizes of the valve ball 212, the seat surface, the tip 231a, and/or the pin 213. This enables the flow rate of the brake fluid, as sucked into the pump 10 through the small-diameter fluid path 211b, to be regulated to a constant value.

Figure 4A:
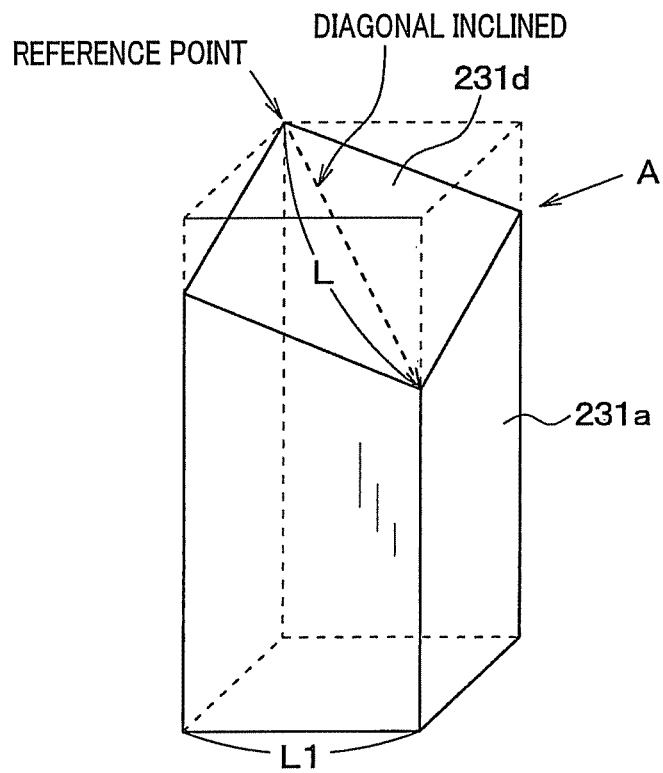
FIG. 4(a) is an enlarged perspective view which illustrates a tip of the shaft in FIGS. 3(a) and 3(b)

The slant surface 231d of the tip 231a is, as illustrated in FIGS. 3(b) and 4(a), geometrically so formed as, to have one of two diagonals of a quadrilateral, as defined by a peripheral edge or four sides of the top end of the square prismatic tip 231a, which is inclined at a given angle to a traverse section of the tip 231a. Specifically, the slant surface 231d is so shaped that one of two opposing corners of the top end of the tip 231a lying on one of the two diagonals of the quadrilateral passing through the center of the quadrilateral is located farthest from the bottom of the tip 231a (i.e., the top of cross-shaped fin 231c) or the piston 22, while the other corner is located closest to the bottom of the tip 231a or the piston 22. Further, the one of the two diagonals of the quadrilateral is inclined at a given angle to the axial direction (i.e., the longitudinal center line) of the tip 231a and at a given angle to the horizontal direction perpendicular to the longitudinal center line of the tip 231a, while the other diagonal extends in the horizontal direction. In other words, the slant surface 231d of the tip 231a is shaped to have a peripheral edge of a polygonal shape with even numbers of vertices and is geometrically formed so that a diagonal line that is one of diagonals of a polygon, as defined the peripheral edge of the top end of the tip 231a (i.e., the slant surface 231d), which passes through the longitudinal center line of the shaft 231 is inclined at a given angle to the direction perpendicular to the longitudinal center line of the shaft 231, and one of two opposing corners of the polygon lying on the diagonal line is located farthest from the piston 22, while the other corner is located closest to the piston 22.

Figure 4B:
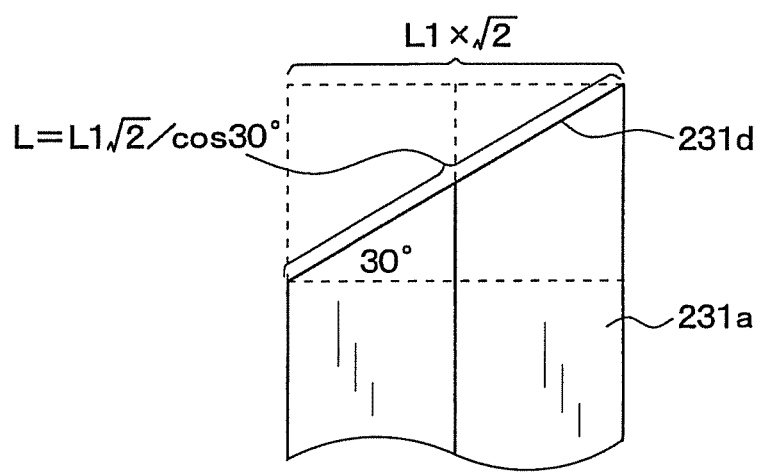
FIG. 4(b) is a side view of FIG. 4(a)
Figure 5A:
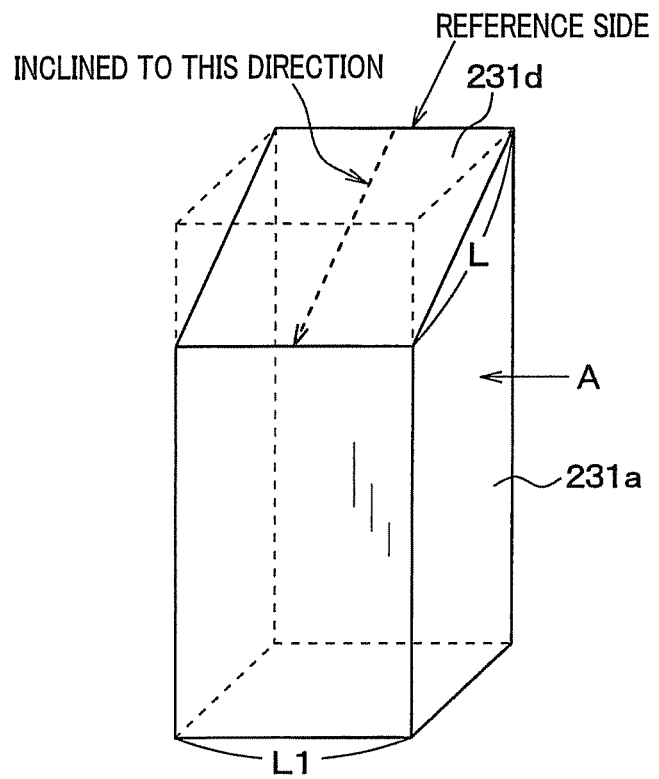
FIG. 5(a) is an enlarged perspective view which illustrates a comparative example of a tip of a shaft.
Figure 5B:
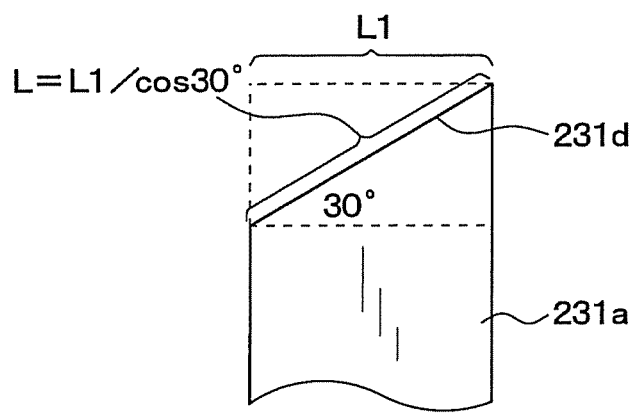
FIG. 5(b) is a side view of FIG. 5(a)

The top end of the square prismatic tip 231a may be, as illustrated in FIG. 5(a), so shaped that one of opposing sides of the quadrilateral, as defined by the peripheral edge or four sides of the top end of the square prismatic tip 231a, is located farthest from the bottom of the tip 231a, while the other side is located closest to the bottom of the tip 231a. In such a geometry of the slant surface 231d, the inclined length L of the slant surface 231d, as illustrated in FIG. 5(b), in other words, the length of the inclined edge of the top end of the tip 231a, as viewed from a direction parallel to the slant surface 231d and perpendicular to the axial direction of the tip 231a (i.e., the direction A in FIG. 5(a)) is shorter than that of the one in FIGS. 4(a) and 4(b). For instance, if the shaft angle, i.e., the angle which the slant surface 231d makes with a plane extending perpendicular to the axial direction of the tip 231a is 30°, and the length of each side of the square top end of the tip 231a is defined as L1, the length L of the slant surface 231d is given by L1/cosine 30°.

The geometry of the slant surface 231d in this embodiment, as illustrated in FIGS. 4(a) and 4(b), maximizes the inclined length L of the slant surface 231d, as viewed from the direction parallel to the slant surface 231d and perpendicular to the axial direction of the tip 231a through the opposing corners (i.e., the direction A in FIG. 4(a)), that is, the length of the longer of the diagonals of the quadrilateral, as defined by the peripheral edge or four sides of the top end of the tip 231a. For instance, if the shaft angle is 30°, and the length of each side of the square top end of the tip 231a is defined as L1, the length L of the slant surface 231d is given by $L1 \times 2^{1/2}$/cosine 30°. The length L of the slant surface 231d of the tip 231d in this embodiment is, therefore, $2^{1/2}$ ($\approx$1.4) times longer than that, as illustrated in FIGS. 5(a) and 5(b).

The size of the valve body 211 of the pressure control reservoir 20 depends upon the overall size of the pressure control reservoir 20. The size of the small-diameter fluid path 211b and the tip 231d of the shaft 231 depends upon the flow rate of the brake fluid required when the check valve is 21 is opened or in the pressure regulating mode. Therefore, the small-diameter fluid path 211b and the tip 231a of the pressure control reservoir 20 equipped with the structure of the shaft 231, as illustrated in FIGS. 4(a) and 4(b), are identical in size with those, as illustrated in FIGS. 5(a) and 5(b), unless the size of the pressure control reservoir 20 is changed, but however, the length L of the slant surface 231d of the shaft 231 of the structure in FIGS. 4(a) and 4(b) is longer than that in FIGS. 5(a) and 5(b) even though the shaft angle is unchanged.

The increased length L of the slant surface 231d of the shaft 231, therefore, results in a widened range where the shaft angle is permitted to be increased without causing the point of contact between the valve ball 212 and the slant surface 231d to be shifted close to the tip of the slant surface 231d when the tip 231a of the shaft 231 lifts up the valve ball 212. In other words, even though the shaft angle is increased, the point of contact between the valve ball 212 and the slant surface 231d is kept away from the tip of the slant surface 231d inwardly. The geometry of the slant surface 231d of this embodiment ensures the stability in location of the valve ball 212 when lifted up by the shaft 231 and results in an increase in range where the shaft angle is permitted to be increased.

When the tip 231a of the shaft 231, as described later in detail, lifts up the valve body 211 through the valve ball 212 to open the large-diameter fluid path 216a, the slant surface 231d of the tip 231a presses the valve body 211 diagonally upward through the valve ball 212, so that the lateral force is exerted on valve body 211 into constant abutment with an inner wall of a valve housing, i.e., one of the six poles 214b of the filter unit 214, thereby holding the valve body 211 from being vibrated in response to the flow of the brake fluid.

The cross-shaped fin 231c of the shaft 231, as clearly illustrated in FIG. 3(b), has shoulders 231e formed on ridges thereof. The shoulders 231e has surfaces facing the piston 22. Similarly, the valve seat 216 has a shoulder 216c formed on the inner wall thereof which defines the large-diameter fluid path 216a. The shoulders 231e of the cross-shaped fin 231c, as can be seen in FIG. 2, rests on the shoulder 216c of the valve seat 216. The shaft 231 which is mounted within the check valve 21 is, therefore, retained firmly by the housing 40. The distance between the shoulder 216c of the valve seat 216 and the upper end surface of the valve seat 216 is constant in the circumferential direction of the valve seat 216, and distances the shoulders 231e of the shaft 231 and the tip 231a are constant. This fixes the locational relation between the tip 231a and the valve ball 212, thus facilitating the ease with which the amount of lift of the valve ball 212 is controlled.

The plate 232 works as a press member to move the shaft 231 toward the valve ball 212 and a stopper to delimit a range where the shift 231 is permitted to reciprocate. The plate 232 is in the shape of a disc and made from, for example, an iron-based material. The plate 232 is moved vertically, as viewed in FIG. 2, by deformation of the diaphragm 233. The outer edge of the stopper 225 hits the stopper 225, thereby stopping the shaft 231 from moving further upward. The amount by which the shift 231 is movable is, therefore, equal to that by which the plate 232 moves until it contacts the stopper 225.

The diaphragm 233 is made from an elastic material such as rubber and disposed between the plate 232 and the partition wall 221a. When the brake fluid pressure control mode is not entered, the diaphragm 233 is, as illustrated in FIG. 2, kept flat. When a pressure difference between the reservoir chamber 20C and the back chamber 40a is created, it will cause the diaphragm 233 to deform as a function of such a pressure difference. Specifically, when the pump 10 sucks the brake fluid, so that negative pressure which is lower than the pressure in the back chamber 40a (i.e., the atmospheric pressure) is produced in the reservoir chamber 20C, it will result in the deformation of the diaphragm 233, thereby pressing the plate 232 upward, as viewed in FIG. 2, to lift up the shaft 231.

The operation of the pressure control reservoir 20 will be described below with reference to FIGS. 6(a) to 6(d).

In the normal braking mode, the pump 10 is at rest. The pressure in the reservoir chamber 20C is balanced with the pressure of the brake fluid, so that the diaphragm 233 does not deform. The shaft 231 is, as illustrated in FIG. 6(a), placed at an initial position, so that the tip 231a is located away from the valve ball 212. The top end of the cross-shaped fin 231c of the shaft 231 is also located away from the valve body 211. The valve ball 212, thus, still rests on the seat surface of the valve body 211, so that the small-diameter fluid path 211b is closed. Similarly, the large-diameter fluid path 216a is also closed by the valve body 211. The check valve 21 is, therefore, closed, thus avoiding the entry of the brake fluid into the reservoir chamber 20C when the brake pedal 1 is depressed, so that the elevated pressure in the master cylinder 3 (i.e., the master cylinder pressure) is transmitted to the reservoir port 20A, which will eliminate the undesirable consumption of the brake fluid in the normal braking mode.

When the pressure regulating mode (e.g., a brake assist control mode) has been entered, and the brake pedal 1 has been depressed to apply the master cylinder pressure to the reservoir port 20A, the actuation of the pump 10 will cause the reservoir chamber 20C to be subjected to negative pressure. This results in, as illustrated in FIG. 6(b), deformation of the diaphragm 233 to move the plate 232 upward, so that the shaft 231 is lifted upward. The tip 231a of the shaft 231 is then inserted into the small-diameter fluid path 211b to push the valve ball 212. Specifically, the slant surface 231d of the tip 231a contacts the valve ball 212 and exerts the lateral force F thereon. The valve ball 212 is pressed by the lateral force F diagonally and then held between the slant surface 231d and the seat surface of the valve body 211. The master cylinder pressure is, as described above, transmitted to the reservoir port 20A, so that the valve ball 212 is kept away from the seat surface of the valve body 211 so as to establish a balance between the pressure in the reservoir chamber 20C and the master cylinder pressure. The degree of deformation of the diaphragm 233 is not, therefore, maximized. The valve body 211 is not lifted up by the shaft 231.

When the pump 10 is in a self-priming mode, for example, a traction control mode or a lateral skid control mode where the master cylinder pressure is not produced is entered, the actuation of the pump 10 to suck the brake fluid to produce the braking force will cause the reservoir chamber 20C to be subjected to the negative pressure. The elevated pressure in the master cylinder 3 (i.e., the master cylinder pressure) is not exerted on the reservoir port 20A, thus resulting in, as illustrated in FIG. 6(c), a maximum degree of deformation of the diaphragm 233 to move the plate 232 upward, so that the shaft 231 is lifted upward into the small-diameter fluid path 211b. The tip 231a of the shaft 231 then pushes the valve ball 212 fully, so that the valve ball 212 hits the bottom of the chamber 213b of the pin 213 and then pushes the pin 213 along with the valve body 211. The large-diameter fluid path 216a is, thus, opened. This results in an increase in area of a fluid path in the pressure control reservoir 20 through which the brake fluid flows from the reservoir port 20A to the pump 10 as compared with when only the small-diameter fluid path 211b is opened, which leads to an enhanced response rate of the brake system in the brake fluid control mode.

When the brake fluid is drained from the wheel cylinders 4 and 5 to the reservoir chamber 20C through the hydraulic line B in the antilock braking mode, the pressure of the brake fluid in the reservoir chamber 20C, as illustrated in FIG. 6(d), urges the piston 22 downward, as viewed in the drawing, against the pressure produced by the spring 223. This results in a decrease in pressure in the wheel cylinders 4 and 5 which is equivalent to the amount of the brake fluid discharged therefrom, thereby avoiding the lock of the wheel of the vehicle under braking.

As apparent from the above discussion, the pressure control reservoir 20 is designed to have the shaft 231 which works to move the valve ball 212 upward or downward, that is, open or close the check valve 21. The shaft 231 has the tip 231a with the slant surface 231d. The slant surface 231d is, as described above, geometrically so designed as to have one of the two diagonals of the quadrilateral, as defined by the peripheral edge of the top end of the tip 231a, inclined at a given angle to a plane extending perpendicular to the length (i.e., the longitudinal center line) of the tip 231a (or the shaft 231). This results in a widened range where the shaft angle is permitted to be increased without causing the point of contact between the valve ball 212 and the slant surface 231d to be shifted close to the tip of the slant surface 231d when the tip 231a of the shaft 231 lifts up the valve ball 212.

The tip 231a of the shaft 231 is of a quadrangular prism shape which is suitable for assembling two press-formed plates to make the shaft 231. Specifically, one of the two press-formed plates is machined to form the tip 231a. For instance, press-formed plates at least one of which has a thickness identical with that of the tip 231a are prepared. The one of the press-formed plates is so machined as to have a top as the tip 231a.

The pressure control reservoir 20 of the second embodiment will be described below with reference to FIGS. 7(a) and 7(b) which is different only in configuration of the tip 231a of the shaft 231 from the first embodiment. The same reference numbers, as employed in the first embodiment, will refer to the same parts, and explanation thereof in detail will be omitted here.

Figure 7A:
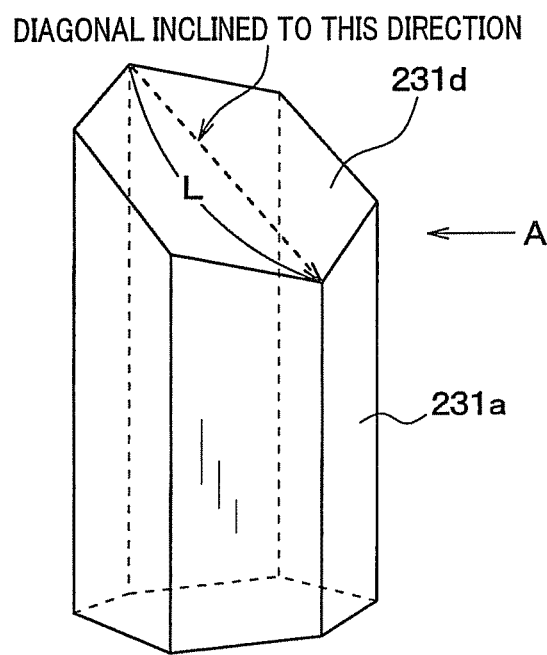
FIG. 7(a) is an enlarged perspective view which illustrates a tip of a shaft according to the second embodiment.

The tip 213a of the shaft 231 of this embodiment is, as clearly illustrated in FIG. 7(a), made of a hexagonal cylinder which is a regular hexagon in cross section extending perpendicular to the axial direction (i.e., the longitudinal direction) thereof. The hexagonal configuration of the tip 231a results in an increase in total area of a gap between the circumference of the tip 231a and the inner wall of the small-diameter fluid path 211b, that is, a total area of a flow path, as defined in the small-diameter fluid path 211b, through which the brake fluid flows in comparison with the cylindrical shape. The slant surface 231d of the tip 231a is hexagonal in shape. Specifically, the slant surface 231d is, as can be seen from FIG. 7(a), geometrically so formed as to have one of diagonals of a hexagon, as defined by a peripheral edge (or six sides) of the top end of the tip 231a, which passes through the center of the hexagon and is inclined at a given angle to a traverse section of the tip 231a. More specifically, the slant surface 231d is so shaped that one of two opposing corners of the top end of the tip 231a lying on the above one of the diagonals is located farthest from the bottom of the tip 231a (i.e., the top of cross-shaped fin 231c) or the piston 22, while the other corner is located closest to the bottom of the tip 231a or the piston 22. This defines the slant surface 231d which is inclined at a given angle to the longitudinal center line of the shaft 231 or a plane extending perpendicular to the longitudinal center line (i.e., the center axis) of the shaft 231.

Figure 7B:
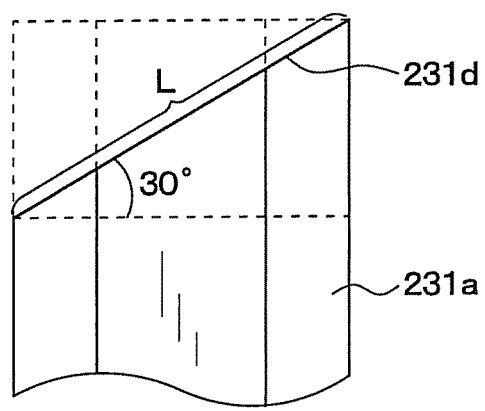
FIG. 7(b) is a side view of FIG. 7(a)

The above hexagonal geometry of the slant surface 231d, as illustrated in FIG. 7(b), increases the entire or inclined length L thereof, thus resulting in a widened range where the shaft angle is permitted to be increased without causing the point of contact between the valve ball 212 and the slant surface 231d to be shifted close to the tip of the slant surface 231d when the tip 231a of the shaft 231 lifts up the valve ball 212.

Figure 8A:
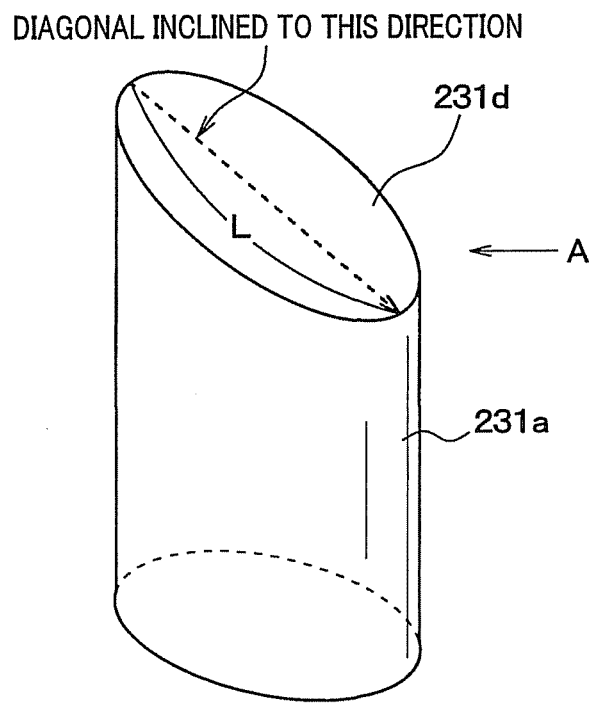
FIG. 8(a) is an enlarged perspective view which illustrates a modification of a tip of a shaft.
Figure 8B:
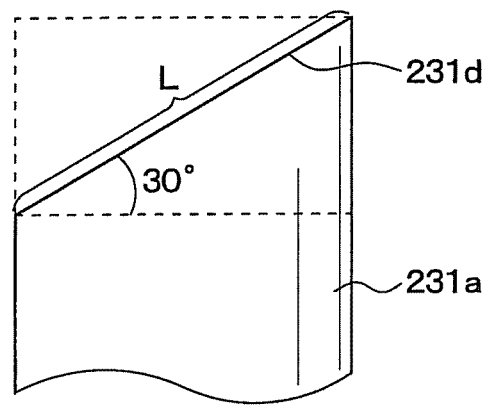
FIG. 8(b) is a side view of FIG. 8(a)
Figure 9B:
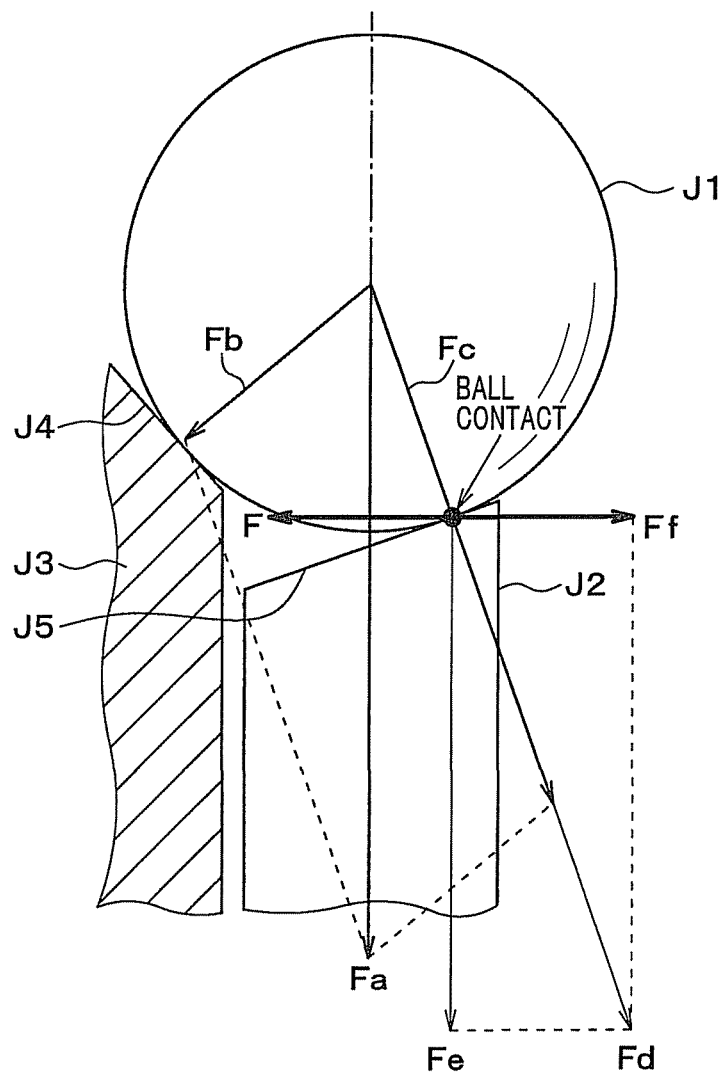
FIG. 9(b) is an explanatory sectional view which illustrates a relation among a shaft angle, a lateral force, and a point of contact between a valve ball and a tapered surface of a shaft.

FIGS. 8(a) and 8(b) illustrate a modification of the shaft 231 which is different only in configuration of the tip 231a from the first embodiment. The same reference numbers, as employed in the first embodiment, will refer to the same parts, and explanation thereof in detail will be omitted here.

The tip 213a of the shaft 231 of this embodiment is, as clearly illustrated in FIG. 7(a), made of an elliptic cylinder which is an ellipse in cross section extending perpendicular to the axial direction (i.e., the longitudinal direction) thereof. The ellipsoidal configuration of the tip 231a results in an increase in total area of a gap between the circumference of the tip 231a and the inner wall of the small-diameter fluid path 211b, that is, a total area of a flow path, as defined in the small-diameter fluid path 211b, through which the brake fluid flows in comparison with the cylindrical shape. The slant surface 231d is, as can be seen from FIG. 8(a), geometrically so formed as to have the major axis (i.e., the longer axis) of the ellipse, as defined by an oval outer edge of the top end of the tip 231a, which is inclined at a given angle to a traverse section of the tip 231a. More specifically, the slant surface 231d is so shaped that one of ends of the major axis is located farthest from the bottom of the tip 231a (i.e., the top of cross-shaped fin 231c) or the piston 22, while the other end is located closest to the bottom of the tip 231a or the piston 22.

The above ellipsoidal geometry of the slant surface 231d, as illustrated in FIG. 8(b), increases the entire or inclined length L thereof, thus resulting in a widened range where the shaft angle is permitted to be increased without causing the point of contact between the valve ball 212 and the slant surface 231d to be shifted close to the tip of the slant surface 231d when the tip 231a of the shaft 231 lifts up the valve ball 212.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

The tip 231a of the shaft 231 in above embodiments is made of the quadrangular prism or the hexagonal prism, but however, may be made of another polygonal column whose cross section extending perpendicular to the center axis thereof is of a regular polygon shape with even numbers of corners or vertices. The more the vertices of the polygon, the smaller the size of a gap (i.e., a flow path) between the tip 231a and the inner wall of the small-diameter fluid path 211b. It is, thus, preferred that the slant surface 231d is of a polygon shape whose number of vertices is smaller.

The pressure control reservoir 20 of each of the embodiments may be designed, like the one disclosed in Japanese Patent First Publication No. 2006-151362, to have the shaft 231 joined directly to the piston body 221.

The pressure control reservoir 20 has been explained as being used in an ABS, but however, this invention may be applied to other types of pressure control chambers designed to have a valve which selectively opens or closes a fluid path leading to a reservoir chamber and a shaft which moves the valve to open or close the fluid path.

What is claimed is:

1. A pressure control reservoir comprising:
   a housing;
   a reservoir chamber which is formed in the housing;
   a fluid flow path which is formed inside the housing and through which fluid flows, the fluid flow path leading to the reservoir chamber;
   a valve body which has formed therein a fluid path which serves as a portion of the fluid flow path, the valve body also having a seat surface around the fluid path;
   a valve ball which works to selectively open and close the fluid path formed in the valve body;
   a shaft which is movable to make the valve ball rest on or leave the seat surface of the valve body to close or open the fluid path, thereby developing a flow rate of the fluid flowing into the reservoir chamber as a function of a size of a gap, as created between the valve ball and the seat surface; and
   a piston which defines the reservoir chamber within the housing and works to move the shaft,
   wherein the shaft has a tip which is polygonal in cross section extending perpendicular to a longitudinal center line of the shaft, the tip having a slant surface which faces the valve ball and works to make a physical contact with the valve ball to make the valve ball rest on or leave the seat surface of the valve body, the slant surface being inclined at a given angle to a direction perpendicular to the longitudinal center line of the shaft, and
   wherein the slant surface has a peripheral edge of a polygonal shape with even numbers of vertices and is geometrically formed so that a diagonal line of the polygonal shape, as defined by the peripheral edge, traverses the longitudinal center line of the shaft, and is inclined at the given angle to the direction perpendicular to the longitudinal center line of the shaft, and one of two opposing corners of the polygonal shape lying on the diagonal line is located farthest from the piston, while the other corner is located closest to the piston.

2. A pressure control reservoir as set forth in claim 1, wherein the slant surface of the shaft is of a quadrangular prism shape.

3. A pressure control reservoir as set forth in claim 2, wherein the shaft is made of an assembly of two press-formed plates, one of the press-formed plates having an end whose thickness is identical with a thickness of the one of the press-formed plates and which forms the tip of the shaft.

* * * * *